US008074627B2

(12) United States Patent
Siddiqui

(10) Patent No.: US 8,074,627 B2
(45) Date of Patent: Dec. 13, 2011

(54) AUTOMOTIVE FUEL SYSTEM LEAK TESTING

(75) Inventor: Shahid Ahmed Siddiqui, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/836,006

(22) Filed: Jul. 14, 2010

(65) Prior Publication Data

US 2011/0139130 A1 Jun. 16, 2011

(51) Int. Cl.
*F02M 33/02* (2006.01)
*G01M 15/00* (2006.01)

(52) U.S. Cl. ............. 123/520; 123/516; 73/40; 73/49.7; 73/114.43

(58) Field of Classification Search .................. 123/520, 123/516, 518; 73/40, 49.7, 114.43
See application file for complete search history.

(56) References Cited

U.S. PATENT DOCUMENTS 5,390,645 A * 2/1995 Cook et al. .................... 123/520
5,483,942 A * 1/1996 Perry et al. .................... 123/520
5,495,749 A * 3/1996 Dawson et al. ................ 73/49.7
6,036,456 A * 3/2000 Peters et al. ............... 417/423.3
6,192,743 B1 * 2/2001 Perry ................................ 73/40
6,247,458 B1 6/2001 Heinemann et al.
6,626,157 B2 * 9/2003 Perry ............................ 123/516
6,761,154 B2 * 7/2004 Takagi et al. ................. 123/520
6,807,851 B2 * 10/2004 Wakahara et al. ......... 73/114.39
6,913,002 B2 7/2005 Mashimo et al.
6,935,317 B2 * 8/2005 Wiesenberger et al. ...... 123/519
7,077,112 B2 * 7/2006 Mitani et al. .................. 123/518
7,207,209 B2 4/2007 Mitani et al.
7,313,487 B2 12/2007 Yoshioka et al.
7,441,549 B2 * 10/2008 Takayanagi ................... 123/520
7,810,475 B2 * 10/2010 Peters et al. .................. 123/519
7,958,912 B2 * 6/2011 Levin .............................. 141/50
2005/0126155 A1 * 6/2005 Thordarson .................... 60/39.6
2009/0107461 A1 * 4/2009 Ulrey et al. ................... 123/456
2009/0151707 A1 * 6/2009 Davis et al. ................... 123/520
2010/0288021 A1 * 11/2010 Makino et al. ................. 73/40.7

* cited by examiner

*Primary Examiner* — Mahmoud Gimie
*Assistant Examiner* — David Hamaoui
(74) *Attorney, Agent, or Firm* — Allan J. Lippa; Alleman Hall McCoy Russell & Tuttle LLP

(57) ABSTRACT

Systems and methods for performing leak testing on fuel system components in hybrid vehicles during engine-off operating conditions are disclosed. For example, a fuel tank may include a pressure accumulator which may be filled with fuel via a fuel pump in order to generate a vacuum which may be used to diagnose leaks in the fuel system.

17 Claims, 5 Drawing Sheets

AUTOMOTIVE FUEL SYSTEM LEAK TESTING

FIELD

The present application relates to fuel system leak testing.

BACKGROUND AND SUMMARY

Fuel systems including fuel tanks may be used to store and provide fuel to engines. For example, a vehicle including an internal combustion engine may include a fuel tank that stores liquid fuels such as gasoline, diesel, methanol, ethanol, and/or other fuels.

Liquid fuels in a fuel tank may evaporate into fuel vapors in the tank. As such, various fuel vapor management systems may be included in a fuel system. Such fuel systems may be substantially sealed from the atmosphere but may include components configured to vent the fuel system to the atmosphere during certain conditions. For example, a fuel system may include a vapor purge canister for filtering fuel vapors during venting.

If there are leaks in the fuel system, e.g., if there are leaks in the fuel tank, canister or any other component of the vapor handling system, then fuel vapor may escape to the atmosphere contributing to vehicle emissions, for example. Various approaches to diagnosing leaks in vehicle fuel systems are known. In one approach, leak testing is achieved by utilizing a vehicle engine to create a vacuum within the fuel tank and measuring pressure changes over a time period.

In one example approach, an external vacuum pump may be used to create a vacuum to perform a leak test in a hybrid vehicle system. However, the inventors herein have recognized that such an approach may increase material and installation costs associated with the installation of such an external vacuum pump and associated hardware and software.

As another example approach, an engine in a hybrid vehicle system may be run specifically for performing leaks tests during engine-off operating modes, for example. However, the inventors herein have recognized that running the engine to perform leak tests when the engine is not used to propel the vehicle may result in a decrease in gas mileage since, in this example, fuel is consumed while performing the leak test.

In some approaches, engine off natural vacuum (EONV) may be employed for leak testing in a hybrid vehicle system. For example, a normally closed canister vent may be opened and a decrease in vacuum may be measured over a long period of time. Such approaches may use correlations between temperature and vacuum build. However, the inventors herein have recognized a number of issues with such EONV approaches. For example, additional hardware and software may increase costs, and long test times in may reduce the feasibility of carrying out a leak test. Additionally, such EONV approaches may degrade during hot ambient temperature conditions. Further, such EONV approaches may not be sufficiently accurate for leak testing, e.g., due to unreliable correlations between temperature and vacuum build (e.g., due to mass transfer between the liquid and vapor in a fuel tank).

The inventors herein have recognized the above deficiencies, and addressed them, in one example approach, by a method of operating an engine emission control system including a fuel vapor retaining device coupled to a fuel tank through a valve is provided. The method comprises: during an engine off condition, selectively operating a fuel pump to store at least some pressure in an accumulator coupled to the fuel pump; and using the stored pressure to determine a leak in the emission control system. In some examples, selectively operating the fuel pump may include operating the pump until a pressure in the accumulator reaches a threshold, and then discontinuing operation of the fuel pump. In other examples, selectively operating the pump may include operating the pump for a selected duration, where the duration selected is based on accumulator pressure.

In this way, the amount of new hardware and/or software used for leak testing may be reduced, resulting in lower material and installation costs, since the fuel pump can be used for engine-off leak detection, as well as engine running fuel supply to the combustion chambers of the engine. Thus, the same pump may be used for leak testing and for supplying fuel to the engine, resulting in a reduced amount of hardware for leak detection. Additionally, vehicle gas mileage may be increased since, in this approach, leak testing may be performed without using the engine. Further, accuracy of a leak test may be increased since such an approach does not depend on pressure and temperature correlations, for example. Further still, shorter test times may be employed in this approach which may result in a greater amount of flexibility in deciding when a leak test may be implemented.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
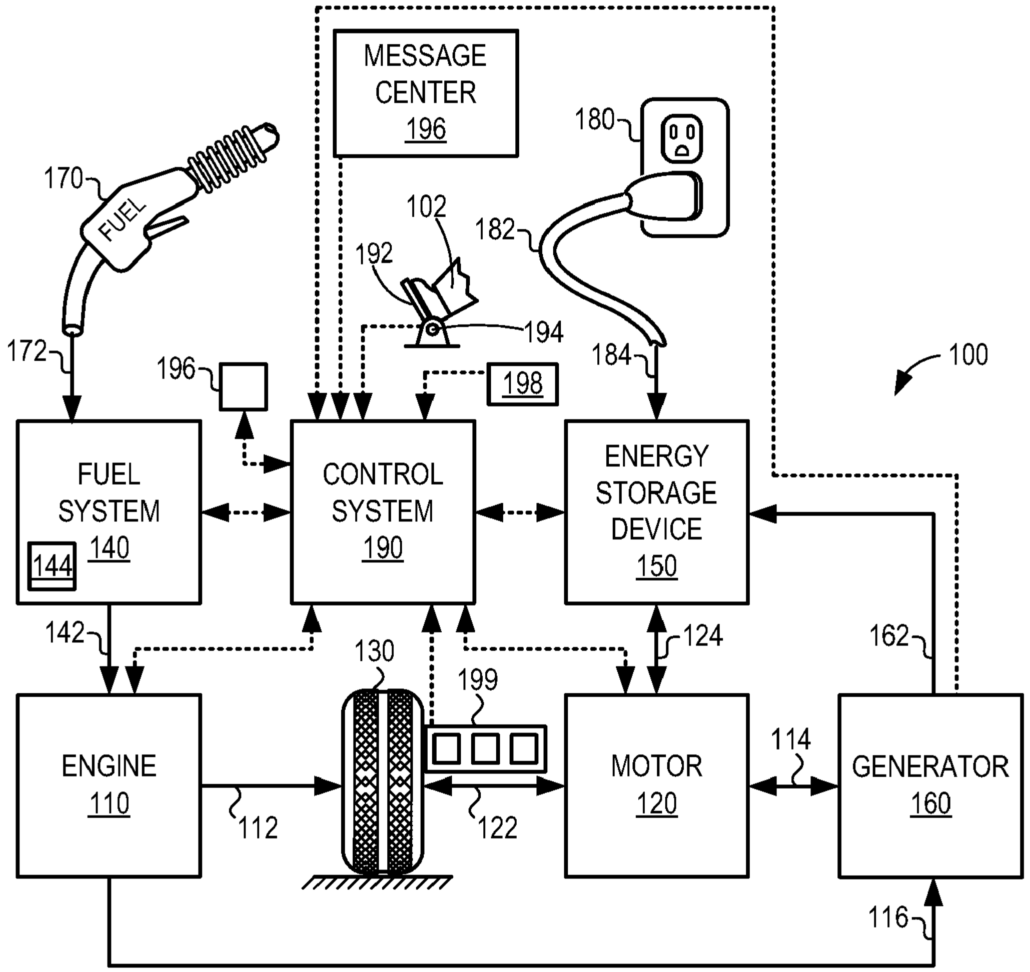
FIG. 1 shows a schematic depiction of a hybrid vehicle.
Figure 2:
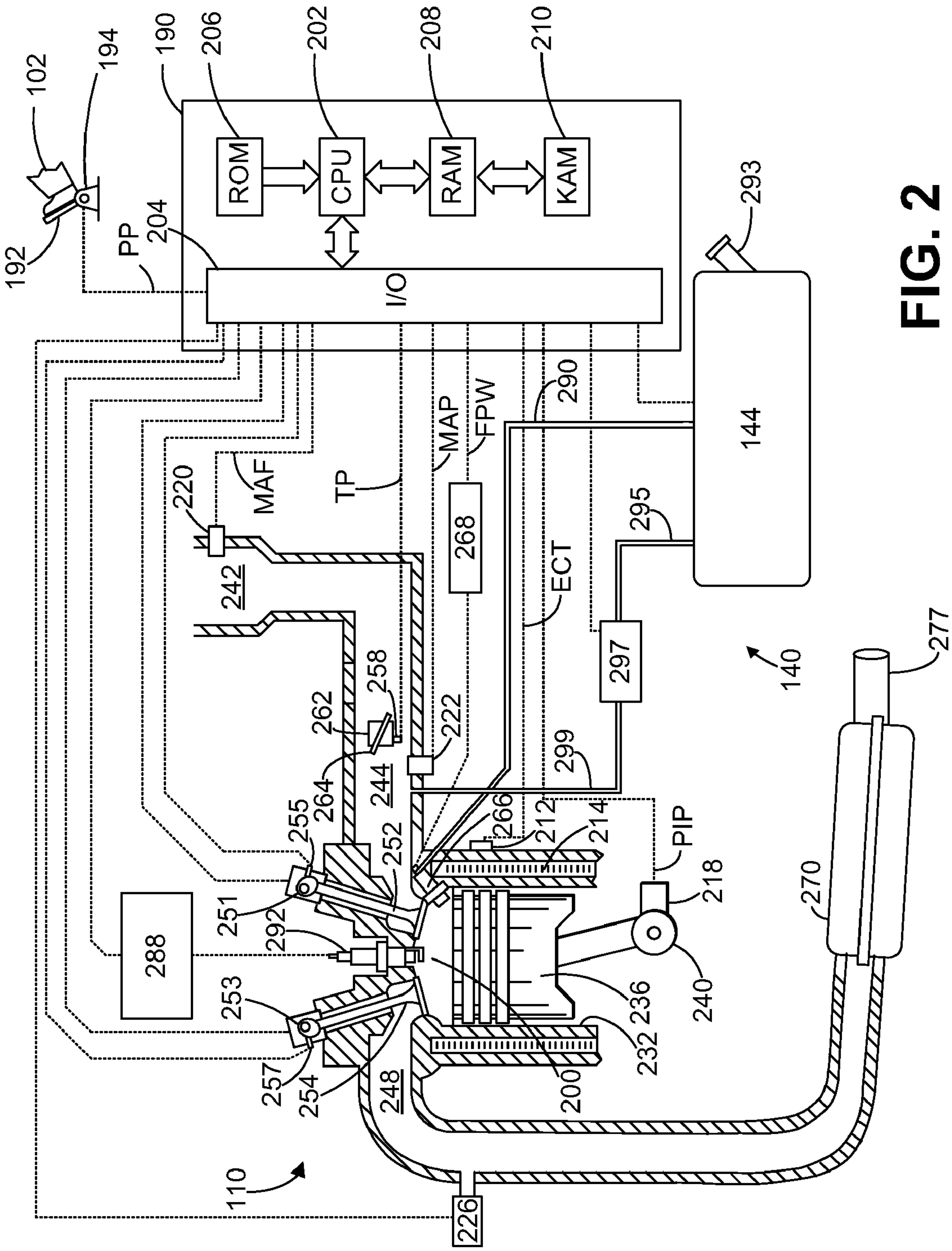
FIG. 2 shows a schematic depiction of an internal combustion engine.

The following description relates to systems and methods for diagnosing fuel system leaks in hybrid vehicles, such as the example hybrid vehicle shown in FIG. 1. Such vehicles may include internal combustion engines fueled by a fuel system, such as shown in FIG. 2.

Figure 3:
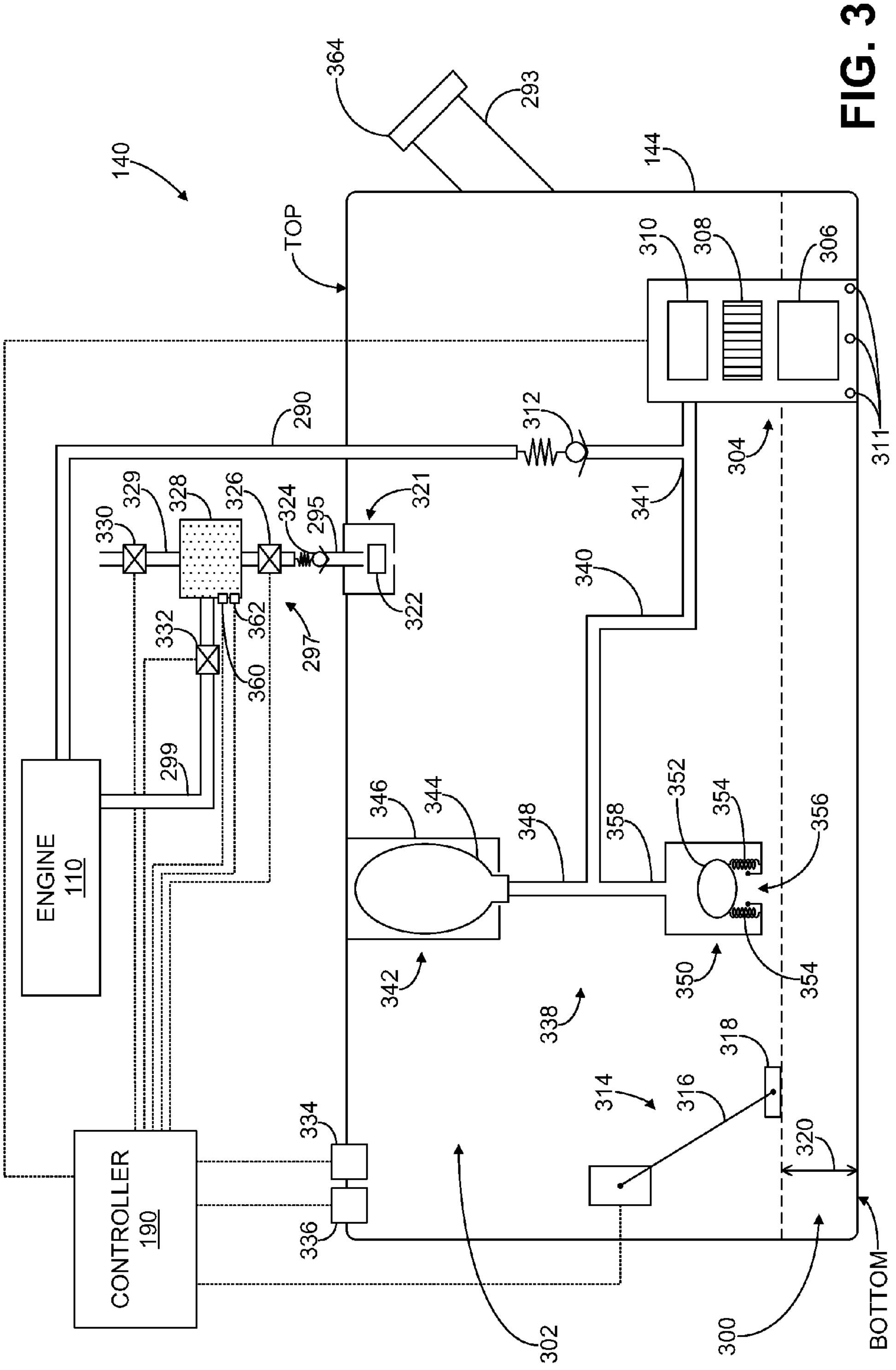
FIG. 3 shows a schematic depiction of a fuel system including a leak detection system.
Figure 4:
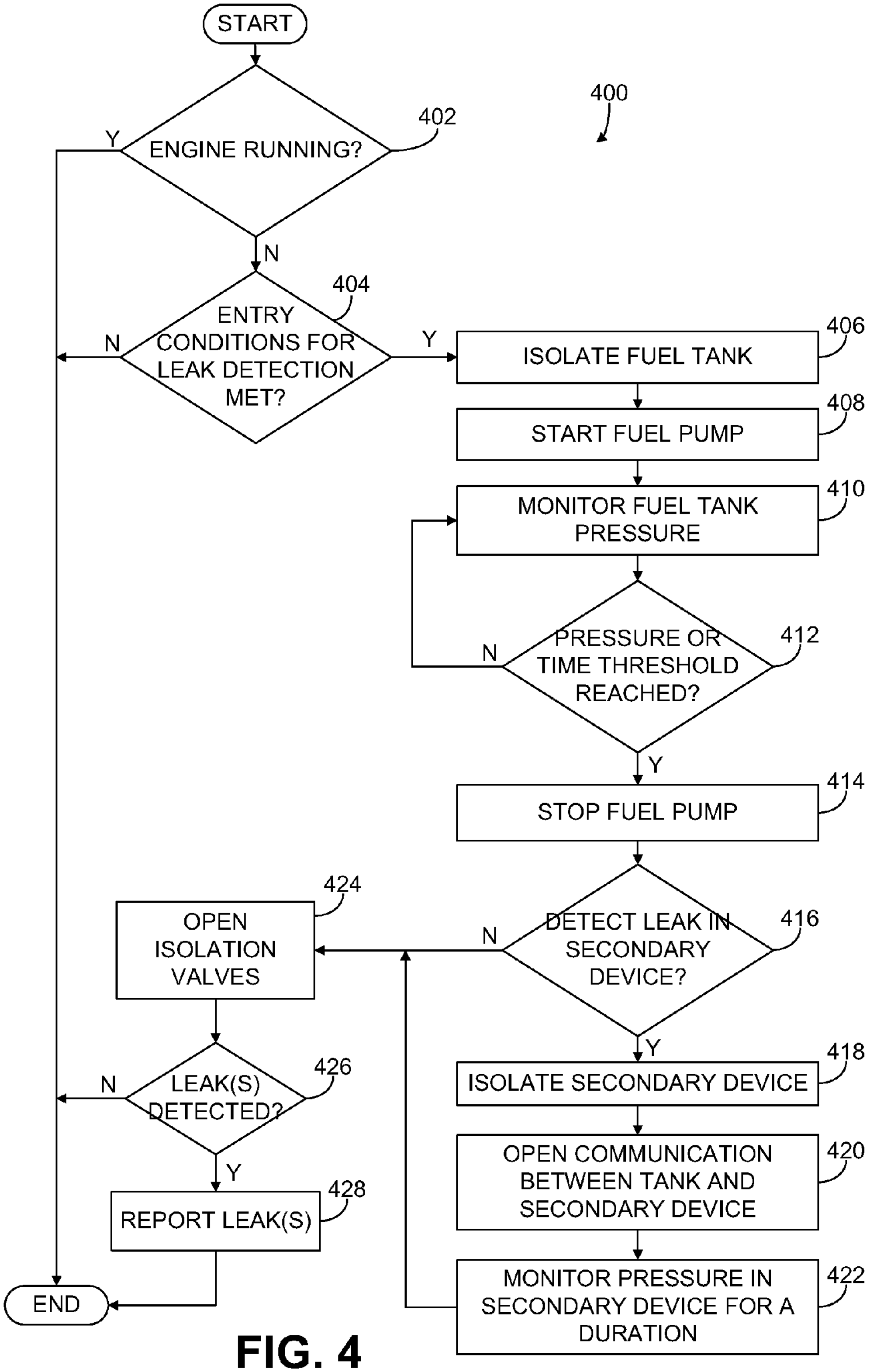
FIG. 4 shows an example method for diagnosing leaks in a fuel system.
Figure 5:
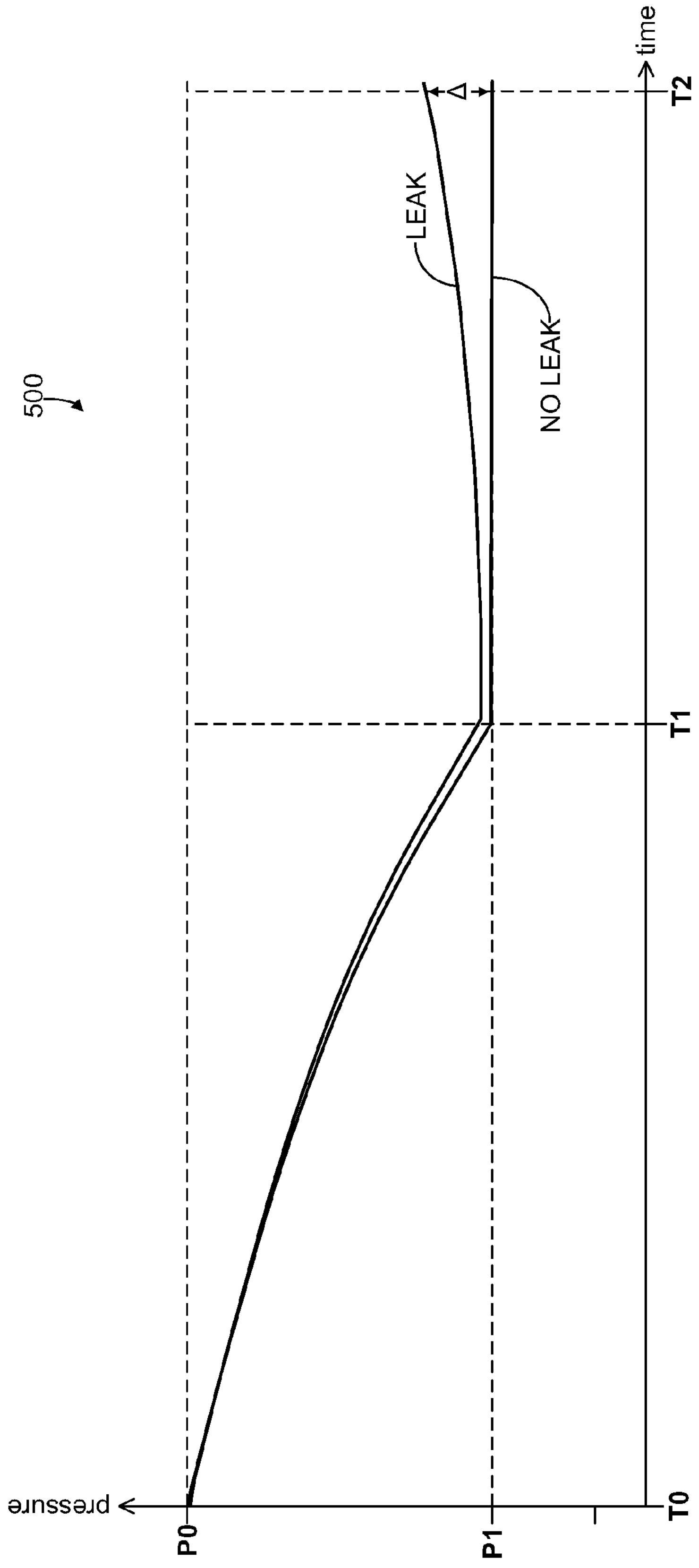
FIG. 5 shows example plots of pressure changes which may occur during leak testing.

A leak detection system may be included within the fuel tank, such as shown in FIG. 3. Such a leak detection system may include a pressure accumulator which may be filled by a fuel pump in the fuel tank in order to create a vacuum in the fuel tank for diagnosing leaks. During certain conditions, the fuel pump may be used for leak testing whereas during other conditions, the same fuel pump may be used to deliver fuel to the engine. FIG. 4 shows an example method for diagnosing leaks in a fuel system including such a pressure accumulator. Leaks may be diagnosed in various components within a fuel system by monitoring pressure changes which occur during the leak testing. FIG. 5 shows example plots of such pressure changes which may occur during leak testing.

Turning now to FIG. 1 a schematic example vehicle propulsion system 100 is shown. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160. As described in more detail below, fuel system 140 may include a variety of components configured to detect leaks in the fuel system.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Additionally, a variety of sensors may be employed for leak testing. For example one or more component in the fuel system may include pressure and/or temperature sensors for monitoring pressure and/or temperature changes during a leak test. Examples of such sensors are described in more detail below.

In some examples, energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic diagram of one cylinder of multi-cylinder engine 110 which may be included in a propulsion system of an automobile, such as the example automobile shown in FIG. 1.

Engine 110 may be controlled at least partially by a control system including controller 190 and by input from a vehicle operator 102 via an input device 192. In this example, input device 192 includes an accelerator pedal and a pedal position sensor 194 for generating a proportional pedal position signal PP.

Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Combustion chamber 200 may receive intake air from intake manifold 244 via intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. The position of throttle plate 264 may be provided to controller 190 by throttle position signal TP from a throttle position sensor 258. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, and an indication of exhaust valve position via sensor 257, among others.

Furthermore, the control system may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

Though engine 110 is shown in FIG. 2 as a normally aspirated engine, in some examples, engine 110 may include a boosting device such as turbocharger or supercharger. For example engine 110 may include a compressor and/or a turbine communicating via a shaft.

In some examples, an emission control device 270 may be coupled to the exhaust passage. Emission control device 270 can include multiple catalyst bricks, in one example. In another example, multiple emission control devices, each with multiple bricks, can be used. In some examples, emission control device 270 may be a three-way type catalyst. In other examples, example emission control device 270 may include one or a plurality of a diesel oxidation catalyst (DOC), selective catalytic reduction catalyst (SCR), and a diesel particulate filter (DPF). After passing through emission control device 270, exhaust gas is directed to a tailpipe 277.

Fuel may be supplied to engine 110 via a fuel system shown generally at 140 in FIG. 2. A variety of fuel system types may be employed to provide fuel to engine 110. For example, fuel system 140 may be a return-less fuel system or a return fuel system.

Fuel system 140 may include a fuel tank 144 with a fuel pump system for delivering fuel via a liquid fuel line 290 the fuel injectors of engine 110 (e.g., fuel injector 266). Fuel tank 144 may include a refueling line 293, wherein fuel may be supplied to the fuel tank for subsequent use by engine 110.

Vapors generated in fuel tank 144 may be routed to a fuel vapor recovery system 297 via a vapor line 295 coupled to the fuel tank. In some examples under certain conditions, the fuel vapor recovery system 297 may deliver vaporized fuel to engine 110 via a fuel vapor delivery line 299. For example, in some examples, during certain conditions fuel vapor may be delivered to intake manifold 244, e.g. during a purge of a fuel vapor canister in the fuel vapor recovery system. Additionally, during certain conditions, leak testing may be performed in the fuel tank and/or one or more components of the fuel vapor recovery system, e.g., the fuel vapor canister. An example fuel system is described in more detail below with regard to FIG. 3.

Turning now to FIG. 3, an example fuel system 140 is shown. Fuel system 140 is configured to store and deliver fuel to an engine, e.g. engine 110. In some examples, such an engine may be included in a hybrid vehicle.

Liquid fuel (e.g., gasoline, ethanol, or blends thereof) may be supplied to fuel tank 144 via refueling line 293. The refueling line may include a fuel cap 364 for evaporatively sealing the refueling line. Thus, fuel tank 144 may include a quantity of liquid fuel 300 and a quantity of vapor fuel 302. For example, vapor fuel 302 may form in fuel tank 144 due to evaporation of the liquid fuel contained therein. The fuel tank may be substantially gas-tight under certain conditions and may be formed of a polymer material, metal material, or the like to accumulate and contain evaporative fuel such a gasoline.

The fuel tank may have a specified orientation. For example, fuel tank 144 may be designed so that it is orientated in a particular direction during use. Thus, fuel tank 144 may have a top side labeled "TOP" in FIG. 3 and a bottom side labeled "BOTTOM" in FIG. 3. For example, when fuel tank 144 is used in a vehicle, the top side may be positioned in a direction opposing the ground and the bottom side may be opposing the top side. In some examples, fuel system 144 may include a variety of components which adjust based on an orientation of the fuel tank. For example, if a vehicle including fuel tank 144 tips over, one or more valves in the fuel system may be sealed to prevent fuel leakage from the fuel tank or to discontinue operation of the fuel tank.

A fuel delivery device 304 is included in fuel tank 144. Fuel delivery device 304 may include a variety of fuel system components which assist in delivery of fuel to engine 110 via liquid fuel delivery line 290. For example, fuel delivery device 304 may include a fuel pump 306, a fuel filter 308, and a pressure regulator 310. In some examples, fuel delivery line 290 may include a check valve 312 which substantially prevents fuel from flowing from the engine to the tank but substantially permits fuel to flow from the fuel tank to the engine, e.g., when pumped thereto.

Fuel pump 306 may be operated in a variety of modes depending on various conditions. For example, the fuel pump may be operated in a first mode during engine-off conditions when leak detection is implemented, for example as described below. However, the fuel pump may operate in a second mode, different from the first mode, during engine-on conditions when supplying fuel to the engine. In some examples, pressures generated, by the fuel pump may be different during different modes. For example, the fuel pump may operate with a first pressure during the first mode, e.g., by operating with a first voltage, and may operate with a second pressure during the second mode, e.g., by operating with a second voltage. In this way, operation of the fuel pump may be adjusted based on whether the pump is supplying fuel to the engine or if leak detection is implemented.

In some examples, the fuel delivery device 304 may be positioned adjacent to a bottom side of the fuel tank, e.g. a base portion of the fuel delivery device may be coupled to a bottom side of the fuel tank. Fuel may be entrained from the fuel tank using fuel pump 306 via a plurality of apertures 311 located at a base portion of fuel delivery device 304.

Fuel tank 144 may include a fuel level sensor 314. Fuel level sensor 314 is configured to sense a level of liquid fuel contained in fuel tank 144. For example, fuel level sensor 314 may include a pivotal arm 316 with a float 318 attached thereto for sensing a fuel level 320. The pivotal arm may be coupled to a solenoid or variable resistor, for example, the signals of which are sent to controller 190. For example, float 318 may rise with increasing fuel level causing pivot arm 316 to pivot and rotate a solenoid to generate a signal to be sent to controller 190.

Fuel system 140 may include a vapor recovery system 297 coupled to fuel tank 144 via a vapor line 295. During some conditions, vapor line 295 may route vapors generated in the fuel tank to the vapor recovery system 297. For example, vapor line 295 may be coupled to the fuel tank via a vent valve 321. Vent valve 321 may include a float 322 so that valve 321 will close if liquid fuel reaches the level of the vent valve.

Vapor recovery system 297 may include one or more fuel vapor retaining devices. For example, vapor recovery system 297 may include a fuel vapor canister 328. Canister 328 may include a suitable adsorbent within which fuel vapor may be substantially stored. For example, canister 328 may include activated charcoal which may adsorb vaporized hydrocarbons.

In some examples, vapor line 295 may include a fuel tank isolation valve (FTIV) 326 disposed in vapor line 295 between the vent valve 321 and fuel canister 326. FTIV valve 326 may be configured to open and close vapor line 295. In one example, FTIV 326 may be a solenoid valve and operation of FTIV 326 may be regulated by a controller by adjusting a duty cycle of the dedicated solenoid. For example, during vehicle operation, FTIV 326 may be maintained in a closed state, such that refueling vapors may be stored in the canister on the canister side of the fuel vapor circuit and diurnal vapors may be retained in the fuel tank on the fuel tank side of the fuel vapor circuit. FTIV 326 may be operated by controller 190 in response to a refueling request or an indication of purging conditions, for example. In these instances, FTIV 326 may be opened to allow diurnal vapors to enter the canister and relieve pressure in the fuel tank. Additionally, FTIV 326 may be operated on controller 190 to perform specific steps of leak detection, such as applying a pressure (positive pressure or vacuum) from fuel tank 144 to canister 328 during a first leak detection condition, or applying a vacuum from canister 328 to fuel tank 144 during a second leak detection condition (e.g., as described in more detail below. In this way, fuel vapor from fuel tank 144 may be selectively routed to fuel canister 328.

In some examples, vapor line 295 may include a check valve 324 disposed in vapor line 295 between vent valve 321. For example check valve 324 may substantially prevent intake manifold pressure from causing gases to flow in the opposite direction of the purge flow. As such, the check valve may be used if the canister purge valve control is not accurately timed or the canister purge valve itself can be forced open by a high intake manifold pressure, e.g., during boost conditions.

An atmosphere vent conduit 329 may be coupled to canister 328. Atmosphere vent conduit may include an atmosphere vent valve 330 disposed therein which may adjust a flow of air and vapors between fuel vapor recovery system 297 and the atmosphere. In this way, the fuel vapor canister may selectively communicate with the atmosphere under certain conditions. For example, controller 190 may energize the canister vent solenoid to close atmosphere vent valve 330 and seal the system from the atmosphere, such as during leak detection conditions. As another example, the canister vent solenoid may be at rest, the atmosphere vent valve 330 may be opened, and the system may be open to the atmosphere, such as during purging conditions. The air passing through the vent may be substantially stripped of fuel vapor by the canister.

In some examples under certain conditions, the fuel vapor recovery system 297 may deliver vaporized fuel to engine 110 via a fuel vapor delivery line 299 coupled thereto. A fuel vapor delivery valve 332 may be disposed in vapor delivery line 299. For example, vapor contained within the fuel canister may be periodically purged from the canister to refresh the adsorbent in the canister (e.g., to refresh the activated carbon within the canister) and delivered to the engine 110, e.g., injected into an intake manifold of engine 110.

A variety of sensors and/or diagnostic devices may be included in fuel system 140. For example, a pressure sensor 334, e.g., fuel tank pressure transducer (FTPT), may be coupled to fuel tank 144. Pressure sensor 334 may be configured to sense a pressure within the fuel tank. As another example, a temperature sensor 336 may be coupled to fuel tank 144 and configured to sense a temperature of the fuel tank. As still another example, a pressure sensor 360 and a temperature sensor 362 may be coupled to fuel canister 328. Sensor readings from the various sensors may be sent to the controller.

Fuel delivery device 304 may be coupled to a leak detection system 338 via a conduit 340. In some examples, conduit 340 may branch off from fuel delivery conduit 290 at a branch point 341.

Conduit 340 splits off at a branch point 347 into a first conduit 348 and a second conduit 358. First conduit 348 is coupled to a pressure accumulation device 342. The pressure accumulation device (accumulator) is configured to receive an amount of fuel when pump 306 is run during engine off operating conditions. Pressure accumulation device comprises a bladder 344 within a solid pressure bottle 346. When pump 306 is run during engine off conditions, an amount of fuel is stored in bladder 344. Bladder 344 may be composed of an elastic material, such as rubber, so that it can expand within bottle 346 when fuel is pumped therein. Bottle 346 functions to hold bladder 344 in place while limiting the expansion of bladder 346 so that the pressure in bladder 346 remains below a threshold pressure. Bottle 346 may be composed of a suitably rigid material such as metal, glass, or rigid plastic, for example. The volume of the bladder may depend on the size of the fuel tank. For example, the volume of the bladder may be 2 liters for a 14 gallon tank.

Second conduit 358 is coupled to a sealing device 350. Sealing device 350 comprises an enclosure 351 with an aperture 356. A sealing member 352 is included in sealing device 350 and is configured to seal aperture 356 while fuel is pumped into the pressure accumulation device. For example, sealing member 352 may be slidably attached to enclosure 351 via a plurality of springs 354. The plurality of springs may be positioned adjacent to a perimeter of aperture 356, for example.

When pump 306 is run during engine off operating conditions, the pressure of the fuel entering enclosure 351 may press the sealing member down to seal the aperture. However, when the pump stops, the sealing member is configured to rise from the aperture so that the aperture is opened and fuel in bladder 344 may be returned to the tank. Thus, for example, when sealing member is attached via a plurality of springs to the enclosure adjacent to a perimeter of the aperture, the spring constants of the springs may be chosen so that the springs allow the sealing member to close when the pump is run during engine off conditions and open when the pump is stopped.

FIG. 4 shows an example method 400 for leak detection during engine off conditions, e.g., using a leak detection system within the fuel tank such as described above.

At 402, method 400 includes determining if the engine is running. For example, hybrid or plug-in hybrid vehicle systems may have two modes of operation: an engine-off mode and an engine-on mode. While in the engine-off mode, power to operate the vehicle may be supplied by stored electrical energy. While in the engine-on mode, the vehicle may operate using engine power. Thus, in this example, determining if the engine is running may include determining a mode in which a vehicle is operating, e.g., engine-on mode or engine-off mode. As another example, determining if the engine is running may include determining if an engine has just been stopped, e.g., in response to a key-off event, e.g., as performed by a driver of a vehicle including the engine, or in response to a change in a mode of operation of a vehicle, e.g., switching from an engine-on mode to an engine-off mode. In yet another example, determining if the engine is running may include determining if the engine is about to be started, e.g., in response to a key-on event, e.g., as performed by a driver of a vehicle including the engine, or in response to a change in a mode of operation of a vehicle, e.g., switching from an engine-off mode to an engine-on mode.

If the engine is not running at 402, method 400 proceeds to 404. At 404, method 400 includes determining if entry conditions for leak detection are met. Entry conditions for leak detection may include a variety of engine and/or fuel system operating conditions and parameters. Additionally, in the case when the engine is included in a vehicle, entry conditions for leak detection may include a variety of vehicle conditions.

For example, entry conditions for leak detection may include a fuel level above a threshold value, e.g., in order to fill the pressure accumulator 342 during leak testing. For example, the threshold value may be an amount of fuel that would permit the accumulator to be sufficiently filled to perform the leak test. As another example, too much fuel in the fuel tank may lead to less available vapor within the tank and larger potential pressure changes which may lead to higher accuracy during leak testing.

As another example, entry conditions for leak detection may include a temperature of one or more fuel system components in a predetermined temperature range. For example, temperatures which are too hot or too cold may decrease accuracy of leakage detection. Such a temperature range may depend on the method used to calculate the leak detection and the sensors employed. However, in some examples, leak detection may occur at any temperature.

As another example, entry conditions for leak detection may include an amount of available energy stored, e.g., in an energy storage device, to run the pump. For example, energy may be supplied to various leak detection components to perform the leak test while the engine is not running. In some examples, this energy may come from a battery or similar energy storage device. Thus, the state of charge, voltage, etc. of a battery may be used in determining whether sufficient energy is available to perform the leak test.

Additionally entry conditions for leak detection may include whether or not a vehicle is in operation and the amount of power being drawn, e.g., amount of torque, engine RPM, etc. by the vehicle is less than a threshold value. For example, in the case of a hybrid vehicle, the vehicle may be in engine off operation powered by the energy storage device, e.g. device 150. In this example, if there is a large draw of energy, e.g. in response to a large torque request, then, in some examples, leak detection may be postponed to reduce the power drawn from the battery. Thus entry conditions for leak detection may be based on various operating conditions of the electric engine, such as speed, torque, etc., or whether auxiliary components, e.g., air conditioning, heat, or other processes, are using more than a threshold amount of stored energy.

As another example, entry conditions for leak detection may include an amount of time since a prior leak testing. For example, leak testing may be performed on a set schedule, e.g. leak detection may be performed after a vehicle has traveled a certain amount of miles since a previous leak test or after a certain duration has passes since a previous leak test.

As another example, entry conditions for leak detection may include a door opening. For example, leak detection may occur when a driver opens a door, e.g., indicating that the driver is about to leave the vehicle.

As another example, entry conditions for leak detection may include a door closing, For example, leak detection may occur when a driver closes the door, e.g., potentially indicating that the car is about to be started.

As another example, entry conditions for leak detection may include a key-off event, e.g., as performed by a driver of a vehicle. For example, leak detection may be performed following a key-off event.

As another example, entry conditions for leak detection may include a key-on event, e.g., as performed by a driver of a vehicle. For example, leak detection may be performed immediately following a key-on event before the engine starts, or an engine may start in an engine-off mode and leak detection may be performed at each key-on and/or key-off event.

As another example, entry conditions for leak detection may be based on a vehicle operating mode change. For example, leak detection may be performed following a transition from engine-on mode to engine-off mode.

As another example, entry conditions for leak detection may include whether or not a leak has previously been detected. For example, if a leak was detected by a prior leak test, then leak testing may not be performed, e.g., until the leak is fixed and an onboard diagnostic system reset.

As another example, entry conditions for leak detection may include if a refueling event is taking place. For example, leak detection may not be performed while the fuel tank is being refilled or when the fuel cap is off, etc.

If entry conditions for leak detection are met at 404, method 400 proceeds to 406. At 406, method 400 includes isolating the fuel tank from the atmosphere. Isolating the fuel tank from the atmosphere may include adjusting one or more fuel system valves. For example, FTIV valve 326 may be closed. Additionally one or more valves may be closed in the fuel line 290.

At 408, method 400 includes starting the fuel pump. The fuel pump may draw power from an energy storage device, for example, while the engine is not running.

At 410, method 400 includes monitoring the pressure of the fuel tank while the fuel pump is in operation. Additionally, the temperature of the fuel tank may be monitored. In some examples, a temperature sensor, e.g., sensor 336 disposed in fuel tank 144, may sample the temperature of the fuel tank one or a plurality of times while the pump is running. The pressure may be monitored by a pressure sensor, e.g., sensor 334 disposed in the fuel tank. For example, throughout the monitoring process, a pressure curve may be generated, e.g. as shown in FIG. 5 described in more detail below. The pressure and temperature readings may be stored in a memory component of a controller for further processing. For example, an initial pressure may be measured when the fuel pump starts and subsequent measurements may be performed thereafter. In some examples, sample rates of such measurements may be varied depending on the accuracy desired and the length of time the pump is run. In other examples, an initial pressure before the pump is run and a final pressure immediately following a discontinuation of the pump operation may be used to determine if a leak is present.

When the pump is run while the engine is off and the fuel tank is isolated, an amount of fuel will be delivered to the leak detection system 338. The pressure of the fuel entering the leak detection system via conduit 340 may press the sealing member 352 down to seal aperture 356 in sealing device 350. The fuel pumped into the leak detection system will then starting filling bladder 344 in the pressure accumulator 342, resulting in a decrease in volume of liquid fuel in the tank. Since, in this case the fuel tank is isolated, the change in volume within the fuel tank will cause a decrease in pressure in the tank, i.e., will create a vacuum in the fuel tank.

A similar approach may be applied to a fuel system including two fuel tanks. In such a scenario, a second fuel tank may function as a bladder for leak detection in a first fuel tank. Likewise, the first fuel tank may function as a bladder for leak detection in the second fuel tank. For example, a two-tank system may be provided with one or more pumps for pumping fuel from the first tank to the second tank to generate a vacuum in the first tank and an increased pressure in the second tank. Then, pressures in each tank may be individually monitored and a leak in the first tank indicated in response to vacuum decay in the first tank and/or a leak in the second tank indicated in response to pressure decay in the second tank, where after operating the one or more pumps to pump fuel among the tanks, the tanks are isolated, for example by a controllable valve positioned in a communication line between the tanks.

At 412, method 400 includes determining if a pressure and/or time threshold is reached. In some examples, the fuel pump may be run for a predetermined period of time, e.g., a time which may result in filling the bladder in the accumulator to a known volume or pressure. Thus the duration that the pump is run may be based on a pumping rate of the pump and a volume of the accumulator. For example by using an initial pressure reading when the pump starts (or immediately before the pump starts), then filling the accumulator with a known volume (by running the pump for a predetermined period of time, for example), an expected pressure decrease may be calculated (e.g., based on the ideal gas law). This expected pressure decrease may be temperature dependent as well.

In other examples, the pressure may be monitored and the pump stopped when the pressure reaches a threshold pressure. For example, the pump may be run until the pressure in the accumulator (e.g., as determined at the pump) reaches an expected pressure (e.g., to give the expected pressure change). However, the time it takes to reach this threshold may be used to determine whether there is a leak or not. In some examples, if there is a leak, the pressure threshold may never be reached thus the method may discontinue pumping after a predetermined time threshold.

If a pressure and/or time threshold is not reached at 412, method 400 proceeds back to step 410 to continue running the fuel pump and monitoring the pressure in the fuel tank. However, if the pressure and/or time threshold is reached at 412, method 400 proceeds to 414.

At 414, method 400 includes stopping the fuel pump once the pressure and/or time threshold is reached. As described above, leak diagnosis may then be performed based on the pressure, temperature, and or time data as described above. If a leak is detected in the fuel tank, a flag may be stored in the memory component, and sent to an onboard diagnostic system to alert a vehicle operator of the leak, for example.

Immediately following cessation of the fuel pump in step 414, a vacuum will be present in the fuel tank. The amount of vacuum present in the fuel tank may depend on whether there is a leak or no leak. In some examples, this vacuum in the fuel tank may be used to diagnose leaks in other fuel system components which may be put in communication with the fuel tank.

As described above, various secondary devices may be communicatively coupled to the fuel tank, e.g., a fuel vapor canister, a second fuel tank, or other vapor management components. By sealing such a secondary component from the atmosphere then putting said component in communication with the fuel tank, a vacuum may be generated in said secondary components. Monitoring the pressure change in the secondary component during this vacuum generation may allow leak diagnostics to be performed on the secondary component.

Thus, At 416, method 400 includes determining if entry conditions are met for leak detection in a secondary device which may be put into communication with the fuel tank. Such entry conditions may depend on what secondary component is being tested and various parameters of the components, engine or vehicle, for example as described above with regard to step 404. For example, if the secondary device is a fuel vapor canister, the entry conditions may depend on when the canister was purged, the duration since the canister was previously testing for leaks, etc.

As another example, entry conditions for leak detection in a secondary device may include whether or not a leak was detected in the fuel tank. In some examples, leak detection may not be performed in a secondary device if a leak was detected in the fuel tank. As described below, leak detection may be performed on a secondary device in the fuel system by transferring at least a portion of the vacuum generated in the fuel tank during leak testing, e.g., by opening one or more valves to put the secondary device in communication with the vacuum generated in the tank. Transferring at least a portion of the vacuum generated in the fuel tank to a secondary device may decrease the vacuum in the fuel tank. Thus, in some examples, if leak testing on a secondary device is to be performed a greater amount of vacuum may be generated in the fuel tank, e.g., by running the pump for a longer period of time. Further, in some examples, entry conditions for leak detection in a secondary device may include an amount of vacuum generated in the fuel tank greater than a threshold value, or an amount of time the pump is run greater than a threshold time. In this way, a sufficient amount of vacuum may be generated in the fuel tank for transferring to a secondary device for leak testing.

If at 416, conditions are met for leak detection in a secondary device, method 400 proceeds to 418. At 418, method 400 includes isolating the secondary device. For example, vent valve 330 may be closed, valve 332 may be closed etc.

At 420, method 400 includes opening communication between the fuel tank and the secondary device. For example in the example of the performing a leak test on the canister, FTIV valve 326 may be opened to put the canister in communication with the fuel tank so that the vacuum in the fuel tank may generate a vacuum in the canister.

At 422, method 400 includes monitoring the pressure in the secondary device for a duration. As described above with regard to step 410, an initial pressure may be determined, e.g., before the FTIV valve is opened, and the pressure may be monitored for a predetermined duration and/or until a predetermined pressure threshold is reached, so that the change in pressure may be compared to an expected change in pressure to determine if leaks occur.

Following the duration, method 400 proceeds to step 424. However, if entry conditions for leak detection in a secondary device is not met at 416, method 400 also proceeds to step 424.

At 424, method 400 includes opening isolation valves. This step may be optional and may depend on various operating conditions of the vehicle.

At 426, method 400 includes determining if one or more leaks were detected in the previous steps. For example, as described above, the pressure changes may be compared to expected pressure changes and flags may be set in a memory component with information indicating which components leaks were detected in.

If no leaks were detected, the method ends. However, if one or more leaks were detected, method 400 proceeds to 428. At 428, method 400 includes reporting the detected leaks. For example, if leaks were found during testing, an onboard diagnostic system (OBD) may be notified to report the leaks to an operator so that the leaking components may be serviced. For example, notification may be sent to message center 196. In some examples, various operating conditions of the engine and/or vehicle may be modified based on where leaks are detected. Additionally, in some examples, leak testing may not be performed again until the leaking components are serviced and the OBD reset.

Since the methods described above may be implemented during engine-off conditions, this approach may provide a greater amount of flexibility in deciding when a leak test may be implemented. For example, under some conditions, the method may be carried out during engine off conditions and after component (such as the engine as indicated by engine coolant temperature) temperatures have cooled to ambient temperatures. Under other conditions, the method may be carried out directly after engine shutdown and before components cool to ambient temperature. For example, the former conditions may include higher ambient temperatures than the latter.

Further, the duration of the leak test may be varied. For example, shorter test times may result in smaller vacuum changes whereas longer test times may result in larger vacuum changes. However, leak detection may still be effectively implemented with sufficient accuracy even during shorter test times. For example, the test durations may be selected based on engine shut-down conditions, such as whether the vehicle is active and travelling, or whether the vehicle is shut-down, with the latter having a longer test duration.

FIG. 5 shows example plots 500 of pressure changes which may occur in a fuel tank, or secondary device during leak testing, e.g., as performed by method 400 described above.

The plots in FIG. 5, show pressure (y-axis) as a function of time (x-axis). As described above, when the pump fills the accumulator within the fuel tank, the volume containing the vapor in the fuel tank increases leading to a decrease in pressure in the fuel tank. This pressure decrease creates a vacuum in the fuel tank. Thus, pressure may decrease in the fuel tank as a vacuum is generated. FIG. 5 shows two curves which have different rates of pressure decrease with increasing time. A first pressure curve labeled "NO LEAK" is an example pressure curve for a fuel tank or secondary device which does not have a leak, or has a sufficiently small leak. A second pressure curve labeled "LEAK" shows an example pressure curve for a device which has a leak.

When leak testing is initiated as described above, at time T0, the fuel pump is started to begin filling the accumulator, or in the case of the secondary device, the secondary device is put in communication with a vacuum generated in the fuel tank (e.g., following leak detection in the fuel tank) at T0. An initial pressure P0 is measure in the device, e.g., before or at time T0. As the accumulator is filled (or as the vacuum is generated in the secondary device), a vacuum is generated in the device being leak tested as indicated by the decreasing pressures shown in the curves.

As described above, the leak testing continues until a time T1 at which the pump is stopped in the case of fuel tank leak testing, or a final pressure is measured in the case of a secondary device. Time T1 may be a predetermined time or may be a time at which the pressure reaches a threshold pressure value P1.

A variety of methods may be employed to determine if a leak is present in the device based on pressure changes during and/or after a generation of a vacuum within the device. In one example, to determine if a leak is in the device, a final pressure measured after the fuel pump stops (after T1) may be used to determine a change in pressure relative to the initial pressure P0. This change in pressure may then be compared to an expected change in pressure to determine is a leak is present. For example, if the determined pressure change after a vacuum is generated in the device is sufficiently different, e.g., by a threshold amount, from the expected change in pressure then a leak may be reported.

As another example, the pressure of the device may be monitored for a predetermined duration following the vacuum generation in the device being leak tested. In such an approach, an increase in pressure above a threshold value may indicate that a leak is present in the device.

The example curves shown in FIG. 5 give an example of no leak being detected and a leak being detected. For the no leak curve, the pressure at T1 is substantially equal to the expected pressure P1, indicating that no leak is present. However, in the leak curve, the pressure at T1 is greater than the expected pressure P1 by a threshold amount, indicating that a leak may be present.

However, in some examples, during generation of a vacuum in the device when the pump is running, the pressure curves generated during both leak and no leak scenarios may be substantially the same. In such examples, the pressure may be monitored for a predetermined duration following discontinuation of the pump at T1 to determine if a leak is present in the device or not. The pump may be discontinued at T1 when a selected vacuum level is reached, for example. At time T2 which follows the discontinuation of the pump by a preselected duration, the pressure in the device may be measured to determine if the pressure in the device is different by a threshold amount than the expected pressure P1. For example, as shown in FIG. 5, when no leak is present, the pressure in the device following discontinuation of the pump at T1 remains substantially equal to the expected pressure P1. Whereas, when a leak is present, the pressure in the device following discontinuation of the pump at T1, may rise due to a leak. For example, if a leak is present, the pressure in the device at T2 may differ from the expected pressure by an amount $\Delta$, which may be a predetermined threshold amount. Alternatively, the time required to reach a selected vacuum level may also be used.

Note that the example systems and methods included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be encoded as microprocessor instructions and stored into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method of operating an engine emission control system, comprising:

during an engine-off condition, selectively operating a fuel pump to store at least some pressure in an accumulator coupled to the fuel pump, the accumulator positioned within a fuel tank, and including a flexible bladder within a rigid bottle and a drain line with a selectively-sealable aperture; and indicating a leak in the emission control system in response to the stored pressure.

2. The method of claim 1, wherein the fuel tank is coupled to a canister through a valve.

3. The method of claim 1, wherein selectively operating the fuel pump includes operating the pump until a pressure in the accumulator reaches a threshold, and then discontinuing operation of the fuel pump.

4. The method of claim 1, wherein selectively operating the pump includes operating the pump for a selected duration, the duration selected based on accumulator pressure.

5. The method of claim 1, wherein a leak is indicated in the fuel tank in response to the stored pressure.

6. The method of claim 2, wherein a leak is indicated in the canister in response to the stored pressure.

7. A method of operating an engine emission control system in a hybrid vehicle including a fuel tank, comprising:

during an engine-off condition, isolating the fuel tank from the atmosphere, and selectively operating a fuel pump to store at least some fuel in an accumulator coupled to the fuel pump and positioned within the fuel tank; and indicating a fuel tank leak in response to a pressure change after fuel is stored in the accumulator, wherein the accumulator includes a bladder within a rigid bottle and a drain line with an aperture, the drain line with an aperture including a sealing member configured to seal the aperture when the fuel pump is in operation and allow fuel in the accumulator to drain into the fuel tank when the fuel pump is not in operation.

8. The method of claim 7, wherein the engine emission control system includes a fuel vapor retaining device coupled to the fuel tank through a valve.

9. The method of claim 7, wherein selectively operating the fuel pump includes operating the pump until a pressure in the accumulator reaches a threshold, and then discontinuing operation of the fuel pump.

10. The method of claim 7, wherein selectively operating the pump includes operating the pump for a selected duration, the duration selected based on accumulator pressure.

11. The method of claim 7, further comprising, following an operation of the fuel pump to store at least some fuel in the accumulator, opening a communication between the fuel tank and a secondary device and indicating a leak in the secondary device in response to a pressure change in said secondary device.

12. The method of claim 11, wherein the secondary device is a fuel vapor canister, and the method further comprises isolating the fuel vapor canister from the atmosphere before opening a communication between the fuel tank and the fuel vapor canister.

13. The method of claim 7, further comprising during engine-off conditions opening a communication between the fuel tank and a secondary device in response to a duration of an operation of the fuel pump greater than a threshold duration and indicating a leak in the secondary device in response to a pressure change in the secondary device.

14. The method of claim 7, wherein said indicating includes reporting said leak to an onboard diagnostic system in the vehicle, the method further comprising, during engine running conditions, operating the fuel pump to deliver fuel from the fuel tank to a fuel rail of the engine to supply fuel to the engine for combustion in the engine.

15. The method of claim 7, wherein the pressure change is based on an initial pressure before the fuel pump is operated and a final pressure when the fuel pump is stopped.

16. A hybrid vehicle system, comprising:

an engine emission control system including a fuel vapor retaining device coupled to a fuel tank through a valve;

a fuel pump within the fuel tank coupled to a pressure accumulator device within the fuel tank;

a pressure sensor disposed within the fuel tank; and a computer readable storage medium having instructions encoded thereon, including:

instructions to, during an engine-off condition, selectively operate the fuel pump to store at least some pressure in the pressure accumulator device;

instructions to indicate a leak in the emission control system in response to the stored pressure; and instructions to, during an engine running condition, operate the fuel pump to deliver fuel to the engine and initiate a spark in a cylinder of the engine to combust the delivered fuel, wherein the pressure accumulator device includes a bladder within a rigid bottle and a drain line with an aperture, the drain line with the aperture including a sealing member configured to seal the aperture when the fuel pump is in operation and allow fuel in the pressure accumulator device to drain into the fuel tank when the fuel pump is not in operation.

17. The system of claim 16, wherein the sealing member is configured to seal the aperture via a plurality of springs coupled to the sealing member and a perimeter of the aperture.

* * * * *